UNITED STATES PATENT OFFICE.

EDWIN TAYLOR, OF NEW YORK, AND FREDERICK P. BERGH, OF YONKERS, NEW YORK.

METHOD OF MAKING SULFURIC ACID.

1,157,455.

Specification of Letters Patent. Patented Oct. 19, 1915.

No Drawing. Application filed December 31, 1913. Serial No. 809,726.

*To all whom it may concern:*

Be it known that we, EDWIN TAYLOR and FREDERICK P. BERGH, citizens of the United States, and residents, respectively, of the borough of Brooklyn, in the city and State of New York, and of Yonkers, in the county of Westchester and State of New York, have invented a new and useful Method of Making Sulfuric Acid, of which the following is a specification.

This invention relates to an improved method of producing chemical reactions, such as oxidations, reductions, combinations, and dissociations by what is known as the contact or catalytic process.

Among the objects to be attained are economy of money and space in the installation of the necessary apparatus; the relatively small amount of the catalytic agent required to be used at one time and the ability to use it over and over again in a continuous operation; the ease with which this small amount of the catalytic agent can be handled and its temperature controlled; a greatly increased area of contact for a given weight of the catalytic agent; the more intimate contact between the catalytic agent and the material to be acted upon thereby; the ability to act upon unpurified materials without impoverishing or poisoning the catalytic agent; the adaptability of the method to a precise control of the mixture of the catalytic agent and the material, the temperature of the same during the reaction, and the length of the contact period; and the ability to cause an increase in, or a cessation of, the reaction by control of the temperature.

We shall illustrate our invention by reference to the production of sulfuric acid, one step in which process consists in oxidizing $SO_2+O$ into $SO_3$.

In the manufacture of sulfuric acid by what is known as the contact or catalytic process, sulfur dioxid ($SO_2$) is formed by the burning or roasting of sulfur ores, such as pyrite, or of pure sulfur. This sulfur dioxid is then separated from the impurities with which it is combined, generally by means of cooling and washing; as the impurities, if permitted to remain, would clog the pores of the catalytic agent and poison the same, thus speedily incapacitating it for its work. The purified $SO_2$ together with O, is then caused to pass through a tube, stack, chimney, chamber or other suitable structure, at a temperature of approximately 400° C., and in which tube or stack is a vertical series of trays, each one supporting a quantity of a catalytic agent, such, for instance, as platinum in the form of platinized asbestos, oxid of iron, etc. This $SO_2+O$ passing through the tube or stack and by the trays referred to, comes into contact with the catalytic agent, and a reaction takes place generating $SO_3$. The $SO_3$ is then passed on into a vessel where it is absorbed with substantially pure sulfuric acid, and is thus made into fuming sulfuric acid $H_2S_2O_7$.

In carrying out the above described process, it is customary to use catalytic agent in a very large amount, say several hundred pounds, or a ton or more; and this requires, of course, large apparatus, and increases the difficulty of handling the catalytic agent itself. Furthermore, the reaction which takes place when $SO_2+O$, comes in contact with the catalytic agent, and is changed into $SO_3$, generates a great amount of heat, which raises the temperature within the stack way above that which is necessary or advantageous for the oxidation of the $SO_2$; and which excessive heat has a tendency to bring about a reversion, thereby separating $SO_3$ back again to $SO_2+O$. This exigency gives rise to the necessity of introducing a cooling medium at a proper point in the stack for the purpose of controlling the temperature of the $SO_3$, and thereby preventing a reversion.

Our invention relates chiefly to the manner of conducting the contact step, and the manner of controlling the temperature during the period in which the $SO_2$ is being oxidized into $SO_3$.

Broadly speaking, one feature of our invention consists in circulating a catalytic agent in the $SO_2+O$. We prefer to circulate the catalytic agent in a moving column of $SO_2+O$, and to have the catalytic agent in a finely subdivided or comminuted form, so that it may be intermingled with the $SO_2+O$, so to speak, as a dust cloud.

In carrying out our process, sulfur ore or pure sulfur is burned in a suitable furnace and in a well known manner. The resultant $SO_2$, together with the impurities generated with it, and in the presence of O, thus constituting $SO_2+O$, is caused to flow in a moving column through a tube, stack, chamber, or equivalent containing structure. If necessary, the gases may be heated near the point of ingress to the container, to the well known proper temperature for oxidation in the presence of a catalytic agent.

While the $SO_2+O$ is thus moving through the container at the proper temperature, a catalytic agent, such as oxid of iron, is injected into the moving gases in a finely comminuted condition, thereby mingling as a dust cloud, with the $SO_2+O$. This intermingling brings about the contact necessary for oxidizing the $SO_2$ into $SO_3$.

The temperature of the mixture, due to the heat generated by the reaction, is controlled at the proper point in the container by the injection or introduction of a stream of cold air or other cooling medium, and this introduction of the cooling medium directly into the material being acted upon, constitutes another broad feature of our invention.

The bulk of the catalytic agent which may be carried along with the $SO_3$, may be removed in any well known or approved manner, such, for instance, as by precipitation by gravity; and the remainder by means of an electric dust collector; and the $SO_3$ after purification in any desired and appropriate manner, may be passed into the absorption chambers in the customary manner. The catalytic agent, after removal, may be returned to the point of introduction and used again in the same manner. After several uses, it may, if necessary, be revivified or purified for subsequent use. By injecting the catalytic agent into the moving column of $SO_2+O$, and particularly in a finely comminuted condition, we are enabled to obtain an enormously increased surface area for a given weight of catalytic agent and a thorough intermingling and contact of the same with $SO_2+O$. And, furthermore, the catalytic agent, in this form, can not readily become clogged or poisoned by impurities associated with the material being acted upon. Thus we are enabled to carry on a continuous process, handling only a few pounds of catalytic agent at a time, instead of a few hundred pounds. We also obviate the necessity of stopping the apparatus and substituting new catalytic agent, while that formerly used is being revivified.

If desired, the temperature of the catalytic agent may be adjusted before it is introduced in order that it may not affect the temperature of the zone of reaction by being at a different temperature itself.

Furthermore, by this method we are enabled to, with great facility, adjust the points of injection of the catalytic agent and of the cooling medium; and this, together with the feature of direct application of the temperature control (hot or cold) to the material, enables us to perfectly control this step and utilize the agents at the most advantageous points in the zone of reaction.

As indicated above, in some processes it will be desirable to introduce a warming rather than a cooling medium, but the principle of direct application is the same in both cases. Again, while we have referred to injecting the catalytic agent into the material to be acted upon, before the latter has been purified, we do not intend to exclude operation upon a material which has been purified; but simply mean to assert, as an important feature of our invention, the ability to act upon unpurified material with good results owing to the form of our catalytic agent.

It will be understood that various changes may be resorted to in the materials, forms of materials and manner of operation without departing from the spirit and scope of our invention, and hence we do not wish to limit ourselves to specific details except as they may be set forth in the claims.

What we claim is:—

1. A method of producing catalytic reactions which includes, first, providing a material to be acted upon, second, passing said material into a container, and, third, injecting a finely subdivided catalytic agent in the form of a dust cloud into the moving material.

2. A method of producing catalytic reactions which includes, first, providing a material to be acted upon, second, injecting a subdivided catalytic agent therein, and, third, controlling the temperature of the reaction by the direct injection of a temperature affecting medium into the material.

3. A method of producing catalytic reactions which includes, first, providing a material to be acted upon; second, passing said material into a container; third, injecting a finely subdivided catalytic agent in the form of a dust cloud into the moving material; and, fourth, controlling the temperature of the reaction by the direct injection of a temperature affecting medium into the material.

4. A method of producing catalytic reactions which includes, first, providing a material to be acted upon; second, injecting a subdivided catalytic agent therein; and, third, controlling the temperature of the reaction by the direct injection of a stream of air into the material.

5. A method of producing catalytic reactions which includes, first, providing a material to be acted upon; second, passing said material into a container; third, injecting a subdivided catalytic agent into the moving material; fourth, separating the catalytic agent from the material; and, fifth, returning the separated catalytic agent from the point of introduction and injecting it again into the succeeding material.

In testimony, that we claim the foregoing as our invention, we have signed our names in presence of two witnesses, this thirtieth day of December 1913.

EDWIN TAYLOR.
FREDERICK P. BERGH.

Witnesses:
F. GEORGE BARRY,
C. L. LUNDGREN.